(12) United States Patent
Chen (10) Patent No.: US 9,941,075 B2
(45) Date of Patent: Apr. 10, 2018

(54) KEYBOARD DEVICE

(71) Applicant: PRIMAX ELECTRONICS LTD., Taipei (TW)

(72) Inventor: Bo-An Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 15/331,535

(22) Filed: Oct. 21, 2016

(65) Prior Publication Data

US 2018/0053609 A1 Feb. 22, 2018

(30) Foreign Application Priority Data

Aug. 19, 2016 (TW) .............................. 105126579 A (51) Int. Cl.
| | | |
|---|---|---|
| *H01H 9/26* | (2006.01) | |
| *H01H 13/72* | (2006.01) | |
| *H01H 13/76* | (2006.01) | |
| *H01H 13/7065* | (2006.01) | |
| *H01H 13/703* | (2006.01) | |
| *G06F 1/16* | (2006.01) | |

(52) U.S. Cl.
CPC ....... *H01H 13/7065* (2013.01); *G06F 1/1662* (2013.01); *H01H 13/703* (2013.01)

(58) Field of Classification Search
CPC ....... H01H 2209/046; H01H 2209/068; H01H 2209/074; H01H 2215/008; H01H 2221/002; H01H 2221/004; H01H 2221/062; H01H 2223/003; H01H 3/25; H01H 71/025; H01H 71/1018; H01H 71/24; H01H 13/10; H01H 13/20; H01H 13/702; H01H 13/704; H01H 13/705; H01H 13/7065; H01H 13/703; G06F 1/662; G06F 3/02

USPC .................. 200/5 A, 5 R, 46, 510, 269, 406, 200/511–514, 520–521, 308, 310–314, 200/317, 337, 341, 344, 345

See application file for complete search history.

(56) References Cited

U.S. PATENT DOCUMENTS

| | | | | |
|---|---|---|---|---|
| 6,020,566 A | * | 2/2000 | Tsai ....................... | H01H 3/122 200/344 |
| 2008/0135392 A1 | * | 6/2008 | Huang .................. | G06F 3/0202 200/5 A |

* cited by examiner

*Primary Examiner* — Anthony R. Jimenez
(74) *Attorney, Agent, or Firm* — Kirton McConkie; Evan R. Witt (57) ABSTRACT

A keyboard device includes a key structure, a base plate and a switch circuit board. The switch circuit board includes a soft covering element. The key structure includes a keycap and a stabilizer bar. The stabilizer bar is connected with the keycap and the soft covering element. The soft covering element is disposed on the switch circuit board. An accommodation space is formed between the soft covering element and the switch circuit board. The stabilizer bar is inserted into the accommodation space and connected with the switch circuit board. The stabilizer bar and the base plate are made of metallic material. Since the stabilizer bar and the base plate are separated by the switch circuit board, the keyboard device is capable of reducing noise.

9 Claims, 11 Drawing Sheets

KEYBOARD DEVICE

FIELD OF THE INVENTION

The present invention relates to an input device, and more particularly to a keyboard device with plural key structures.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices. The subject of the present invention is related to a keyboard device.

Figure 1:
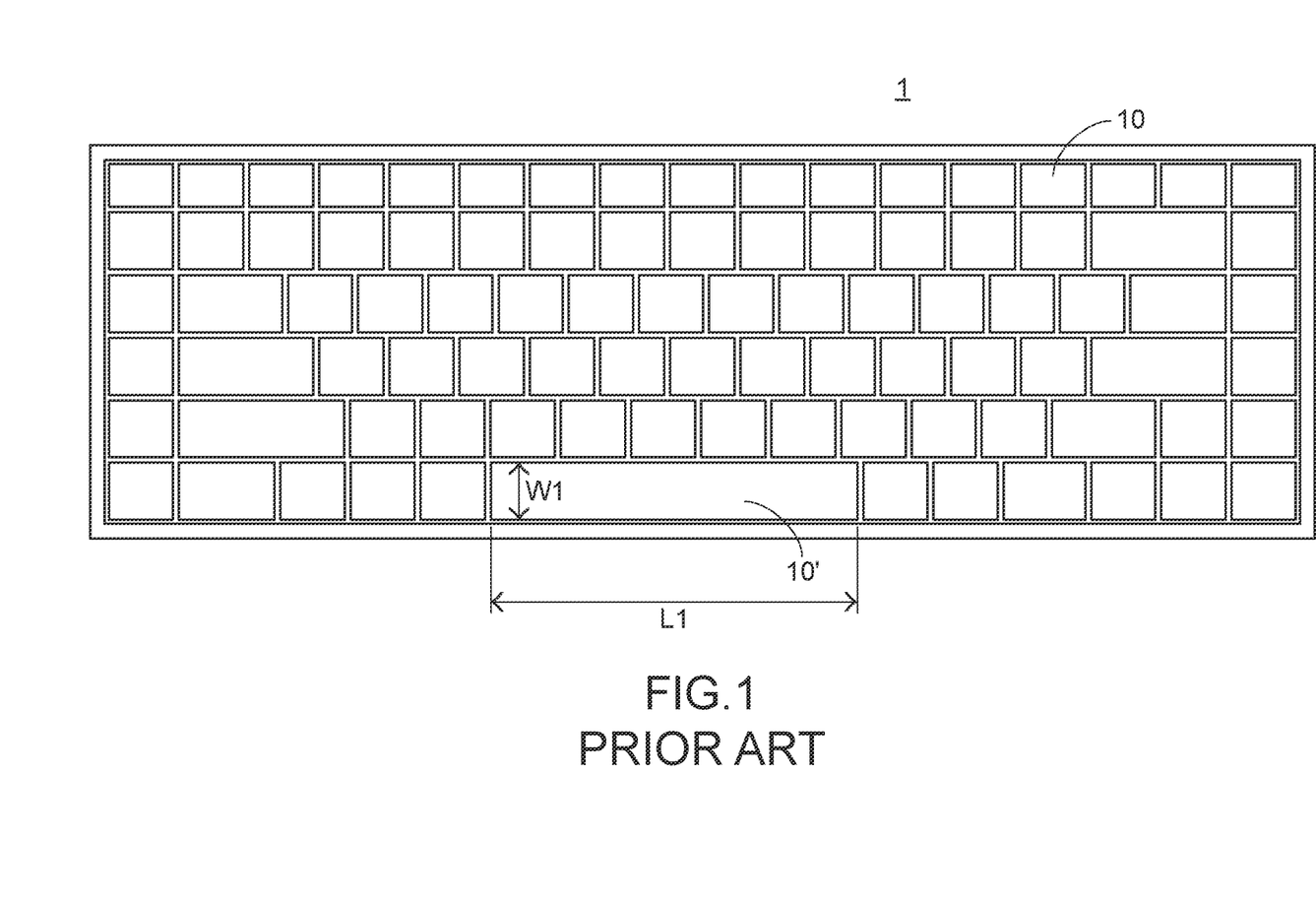
FIG. 1 is a schematic top view illustrating the outer appearance of a conventional keyboard device.

FIG. 1 is a schematic top view illustrating the outer appearance of a conventional keyboard device. As shown in FIG. 1, plural key structures 10 and 10' are disposed on a top surface of the conventional keyboard device 1. The key structures 10 have the ordinary sizes. The key structures 10' are relatively longer. That is, the length of the key structure 10 is slightly larger than the width of the key structure 10, and the length L1 of the key structure 10' is much larger than the width W1 of the key structure 10'. When one of the key structures 10 and 10' is depressed by the user's finger, a corresponding key signal is generated to the computer, and thus the computer executes a function corresponding to the depressed key structure. Generally, the user may depress the key structures 10 and 10' to input corresponding English letters (or symbols) or numbers or execute various functions (e.g., F1~F12 or Delete). For example, the conventional keyboard device 1 is a keyboard for a notebook computer.

Figure 2:
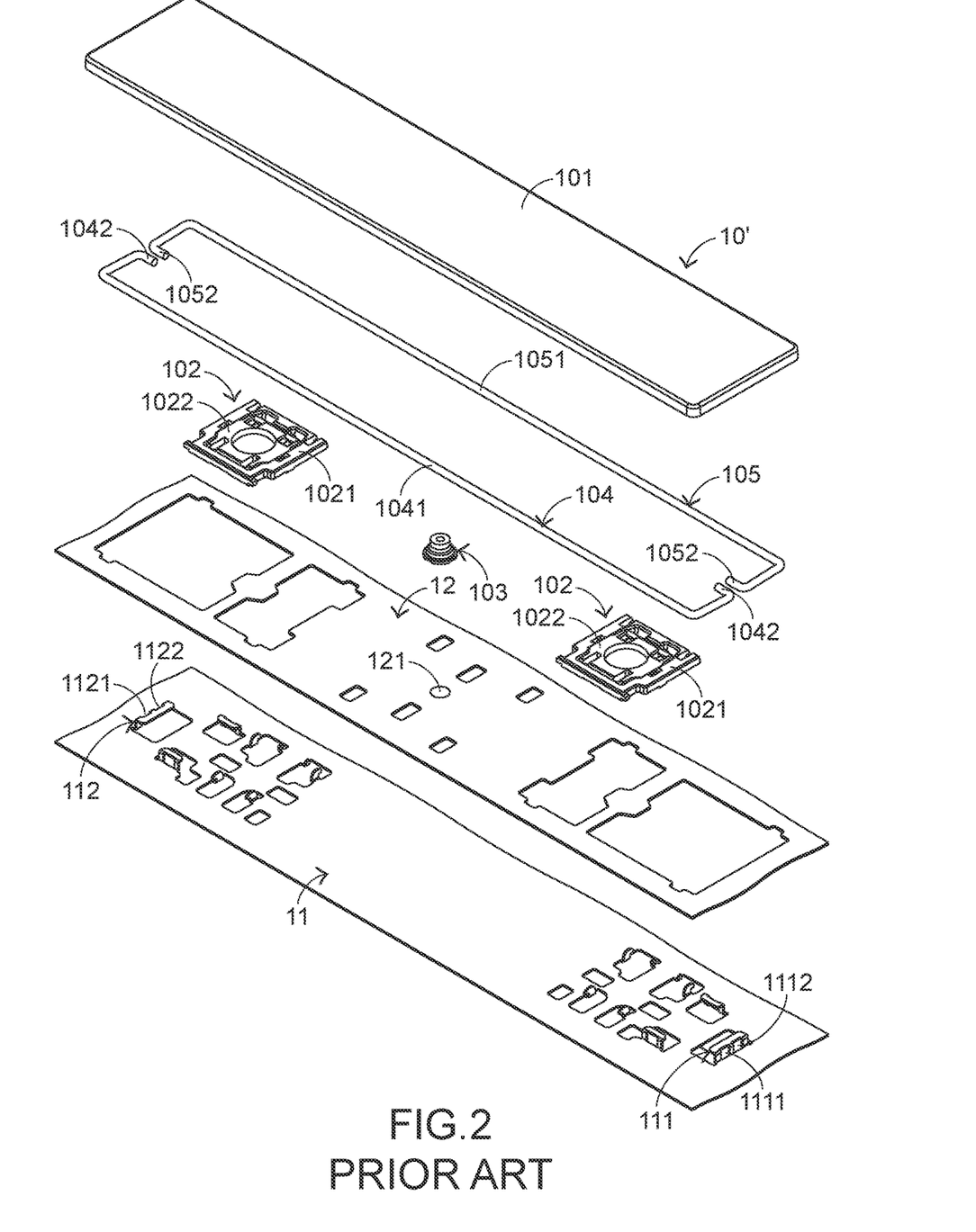
FIG. 2 is a schematic exploded view illustrating a portion of the conventional keyboard device and taken along a viewpoint.
Figure 3:
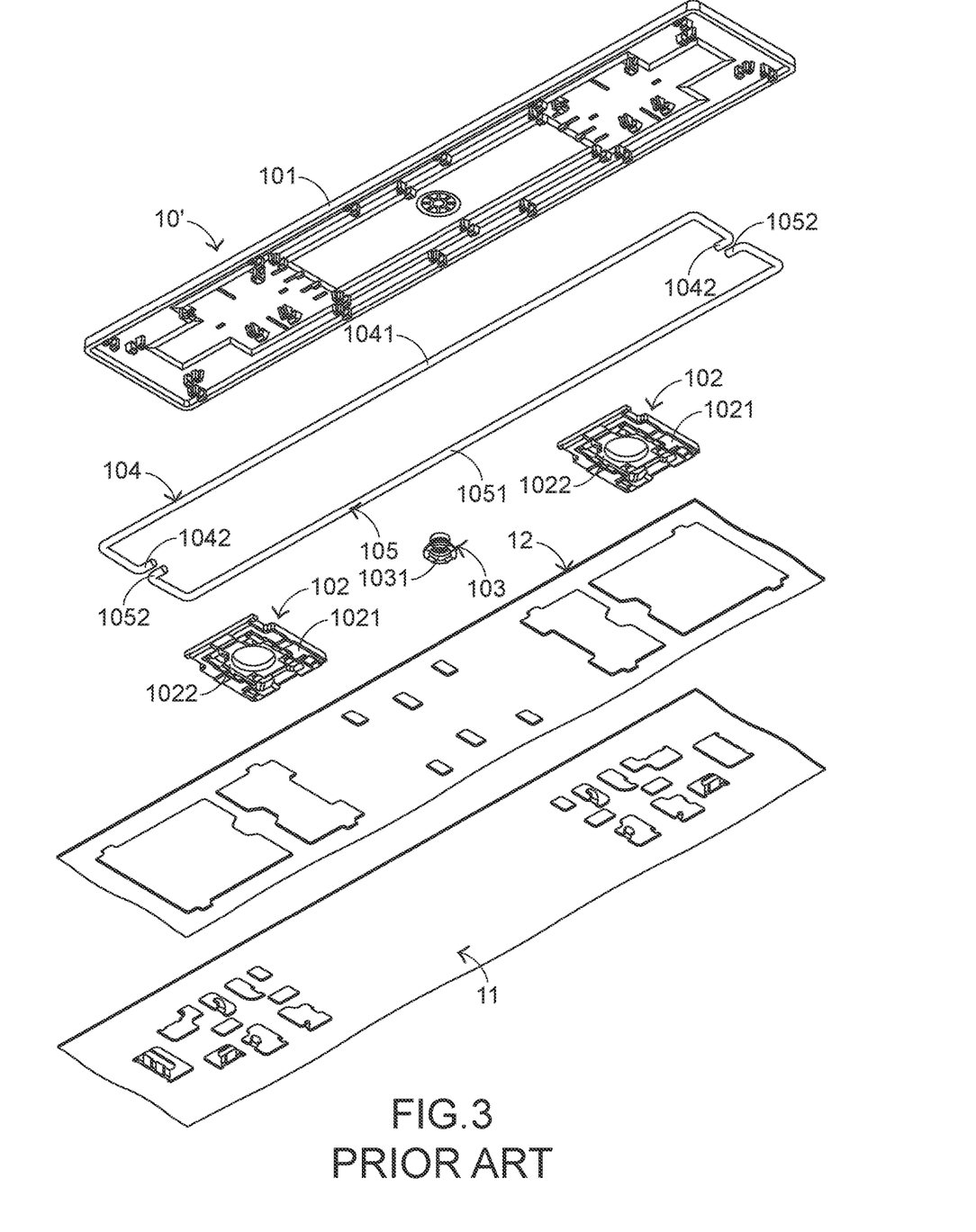
FIG. 3 is a schematic exploded view illustrating a portion of the conventional keyboard device and taken along another viewpoint.

The structures of the conventional keyboard device will be illustrated as follows. FIG. 2 is a schematic exploded view illustrating a portion of the conventional keyboard device and taken along a viewpoint. FIG. 3 is a schematic exploded view illustrating a portion of the conventional keyboard device and taken along another viewpoint. Please refer to FIGS. 1, 2 and 3. The conventional keyboard device 1 comprises plural key structures 10 and 10', a metallic base plate 11 and a membrane circuit board 12. The membrane circuit board 12 comprises plural membrane switches 121 corresponding to the plural key structures 10 and 10'. Each of the plural key structures 10 and 10' comprises a keycap 101, at least one scissors-type connecting element 102 and a rubbery elastomer 103. The scissors-type connecting element 102 is connected between the keycap 101 and the metallic base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The rubbery elastomer 103 is arranged between the keycap 101 and the metallic base plate 11. Moreover, the rubbery elastomer 103 comprises a contacting part 1031.

While the keycap 101 of any key structure 10 or 10' is depressed and moved downwardly relative to the metallic base plate 11, the first frame 1021 and the second frame 1022 of the scissors-type connecting element 102 are switched from an open-scissors state to a stacked state. Moreover, as the keycap 101 is moved downwardly to compress the rubbery elastomer 103, the corresponding membrane switch 121 is pushed and triggered by the contacting part 1031 of the rubbery elastomer 103. Consequently, the membrane circuit board 12 generates a corresponding key signal. When the keycap 101 of the key structure 10 or 10' is no longer depressed, the keycap 101 is moved upwardly relative to the metallic base plate 11 in response to an elastic force of the rubbery elastomer 103. Meanwhile, the first frame 1021 and the second frame 1022 are switched from the stacked state to the open-scissors state again, and the keycap 101 is returned to its original position.

In the keyboard device 1, the key structures 10' and the key structures 10 are distinguished. As shown in the drawings, the length L1 of the key structure 10' is much larger than the width W1 of the key structure 10'. Since the length L1 of the keycap 101 of the key structure 10' is relatively longer, the keycap 101 is readily rocked while the key structure 10' is depressed. That is, the operating smoothness of the key structure 10' is adversely affected, and even the tactile feel of the user is impaired. For increasing the operating smoothness of the key structure 10', the key structure 10' is further equipped with a special mechanism. For example, the key structure 10' further comprises a first stabilizer bar 104 and a second stabilizer bar 105. The first stabilizer bar 104 comprises a first linking bar part 1041 and two first hook parts 1042. The two first hook parts 1042 are located at two ends of the first stabilizer bar 104, respectively. The second stabilizer bar 105 comprises a second linking bar part 1051 and two second hook parts 1052. The two second hook parts 1052 are located at two ends of the second stabilizer bar 105, respectively.

The metallic base plate 11 comprises a first connecting structure 111 and a second connecting structure 112. The first connecting structure 111 and the second connecting structure 112 are protruded upwardly, and penetrated through the membrane circuit board 12. The first connecting structure 111 comprises a first locking hole 1111 and a third locking hole 1112. The second connecting structure 112 comprises a second locking hole 1121 and a fourth locking hole 1122. The second locking hole 1121 corresponds to the first locking hole 1111, and the fourth locking hole 1122 corresponds to the third locking hole 1112.

The first linking bar part 1041 of the first stabilizer bar 104 and the second linking bar part 1051 of the second stabilizer bar 105 are pivotally coupled to the keycap 101 of the key structure 10'. The two first hook parts 1042 of the first stabilizer bar 104 are penetrated through the first locking hole 1111 of the first connecting structure 111 and the second locking hole 1121 of the second connecting structure 112, respectively. The two second hook parts 1052 of the second stabilizer bar 105 are penetrated through the third locking hole 1112 of the first connecting structure 111 and the fourth locking hole 1122 of the second connecting structure 112, respectively.

Figure 4:
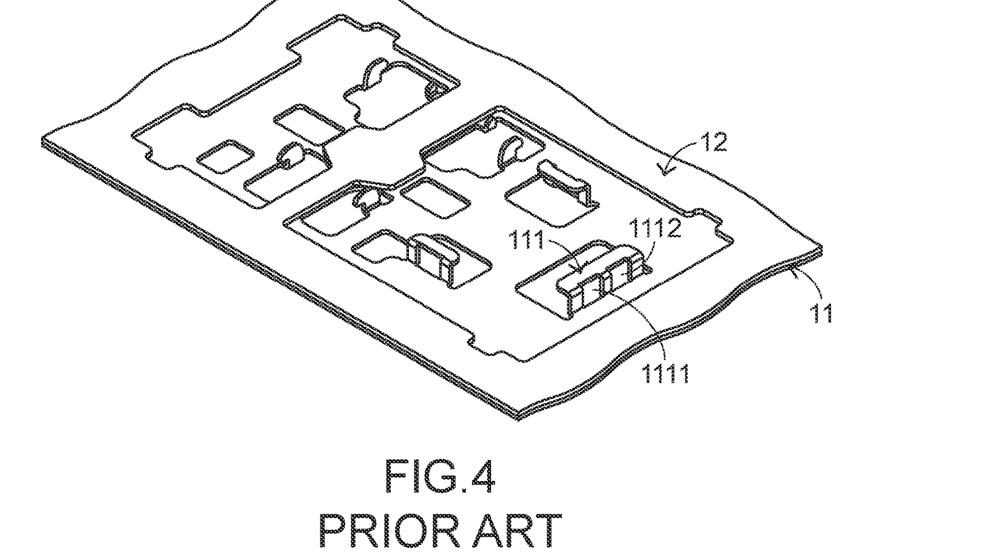
FIG. 4 is a schematic perspective view illustrating a portion of the combination of the metallic base plate and the membrane circuit board of the conventional keyboard device.
Figure 5:
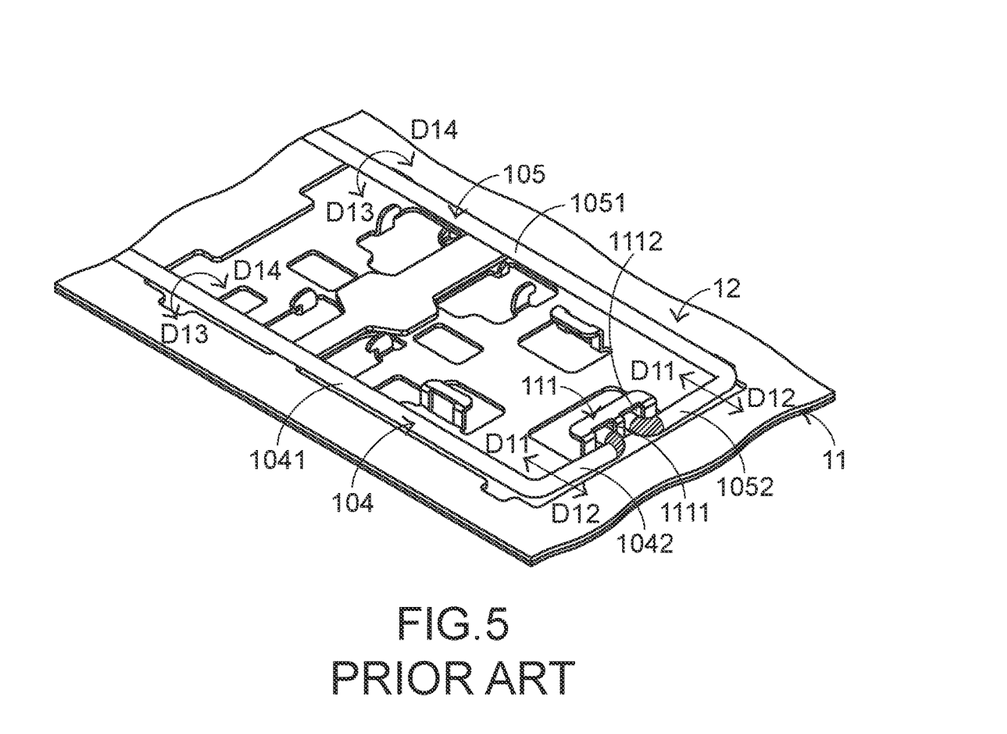
FIG. 5 schematically illustrates the actions of the first stabilizer bar and the second stabilizer bar of the conventional keyboard device.

FIG. 4 is a schematic perspective view illustrating a portion of the combination of the metallic base plate and the membrane circuit board of the conventional keyboard device. FIG. 5 schematically illustrates the actions of the first stabilizer bar and the second stabilizer bar of the conventional keyboard device. Please refer to FIGS. 4 and 5. While the keycap 101 of the key structure 10' is moved upwardly or downwardly relative to the metallic base plate 11, the first stabilizer bar 104 is moved in a first direction D11 or a second direction D12 and rotated in a first rotating direction D13 or a second rotating direction D14. Similarly, the second stabilizer bar 105 is moved in the first direction D11 or the second direction D12 and rotated in the first rotating direction D13 or the second rotating direction D14. By the first stabilizer bar 104 and the second stabilizer bar 105, the key structure 10' is kept stable and not inclined while the key structure 10' is moved upwardly or downwardly relative to the metallic base plate 11. Moreover, the uses of the first stabilizer bar 104 and the second stabilizer bar 105 are helpful to increase the strength of the keycap 101. However, the conventional keyboard device 1 still has some drawbacks. For example, all of the first stabilizer bar 104, the second stabilizer bar 105 and the metallic base plate 11 are made of metallic material. Please refer to FIGS. 4 and 5. While the keycap 101 of the key structure 10' is moved upwardly or downwardly relative to the metallic base plate 11 and the first stabilizer bar 104 and the second stabilizer bar 105 are correspondingly moved and rotated, the two first hook parts 1042 of the first stabilizer bar 104 and the two second hook parts 1052 of the second stabilizer bar 105 are readily contacted with the metallic base plate 11. While the two first hook parts 1042 and the two second hook parts 1052 collide with the metallic base plate 11, a click sound is generated. Especially when the R corners of the two first hook parts 1042 and the two second hook parts 1052 (e.g., the regions indicated by oblique lines of FIG. 5) collide with the metallic base plate 11, the click sound is generated. This sound is unpleasant noise to the user.

Therefore, there is a need of providing a keyboard device with reduced noise.

SUMMARY OF THE INVENTION

An object of the present invention provides a keyboard device with reduced noise.

In accordance with an aspect of the present invention, there is provided a keyboard device. The keyboard device includes a key structure, a base plate and a switch circuit board. The key structure includes a keycap and a stabilizer bar. The keycap is exposed outside the keyboard device. The stabilizer bar is connected with the keycap and comprises a linking bar part and a hook part. The linking bar part is connected with the keycap. The hook part is located at an end of the linking bar part. The base plate is disposed under the key structure, and connected with the key structure. The switch circuit board is arranged between the key structure and the base plate. When the switch circuit board is triggered, a key signal is generated. The switch circuit board includes a key switch and a soft covering element. The key switch is aligned with the key structure. When the key switch is triggered by the key structure, the key switch generates the key signal. The soft covering element is disposed on the switch circuit board. An accommodation spaces is defined by the soft covering element and the switch circuit board collaboratively. The hook part is inserted into the accommodation space. Consequently, the hook part is permitted to be moved within the accommodation space.

From the above descriptions, the present invention provides the keyboard device. The lower wiring plate of the switch circuit board has extension regions. The first hook parts and the second hook parts are separated from the base plate through the extension regions. Consequently, the first hook parts and the second hook parts do not collide with the base plate. Moreover, the soft covering elements made of soft material are disposed on the extension regions to replace the metallic connecting structures of the conventional keyboard. Even if the first stabilizer bar and the second stabilizer bar are made of the metallic material, the first hook parts and the second hook parts are only contacted with the soft covering elements but not contacted with the metallic base plate. That is, the first hook parts and the second hook parts do not collide with the base plate to generate the unpleasant noise. Consequently, the keyboard device of the present invention is capable of reducing the noise.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides a keyboard device. First of all, the structure of the keyboard device will be illustrated as follows.

Figure 6:
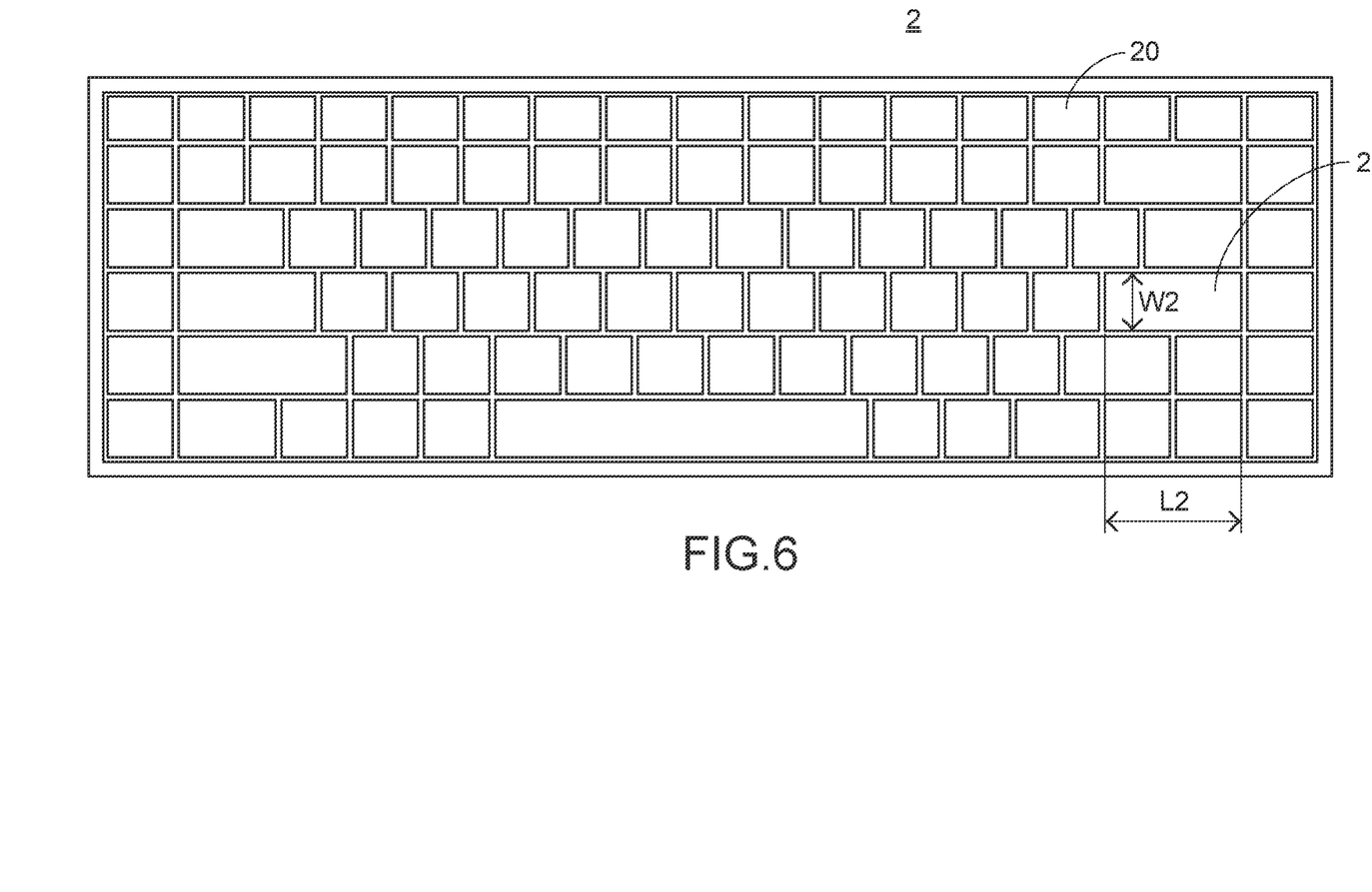
FIG. 6 is a schematic top view illustrating the outer appearance of a keyboard device according to a first embodiment of the present invention.

FIG. 6 is a schematic top view illustrating the outer appearance of a keyboard device according to a first embodiment of the present invention. The keyboard device 2 comprises plural key structures 20 and 20'. These key structures 20 and 20' are exposed outside the keyboard device 2. When one of the key structures 20 and 20' is depressed by the user's finger, a corresponding key signal is generated to a computer (not shown) that is in communication with the keyboard device 2. Consequently, the computer executes a function corresponding to the depressed key structure. The length of the key structure 20 is slightly larger than the width of the key structure 20. The length L2 of the key structure 20' is much larger than the width W2 of the key structure 20'.

Figure 7:
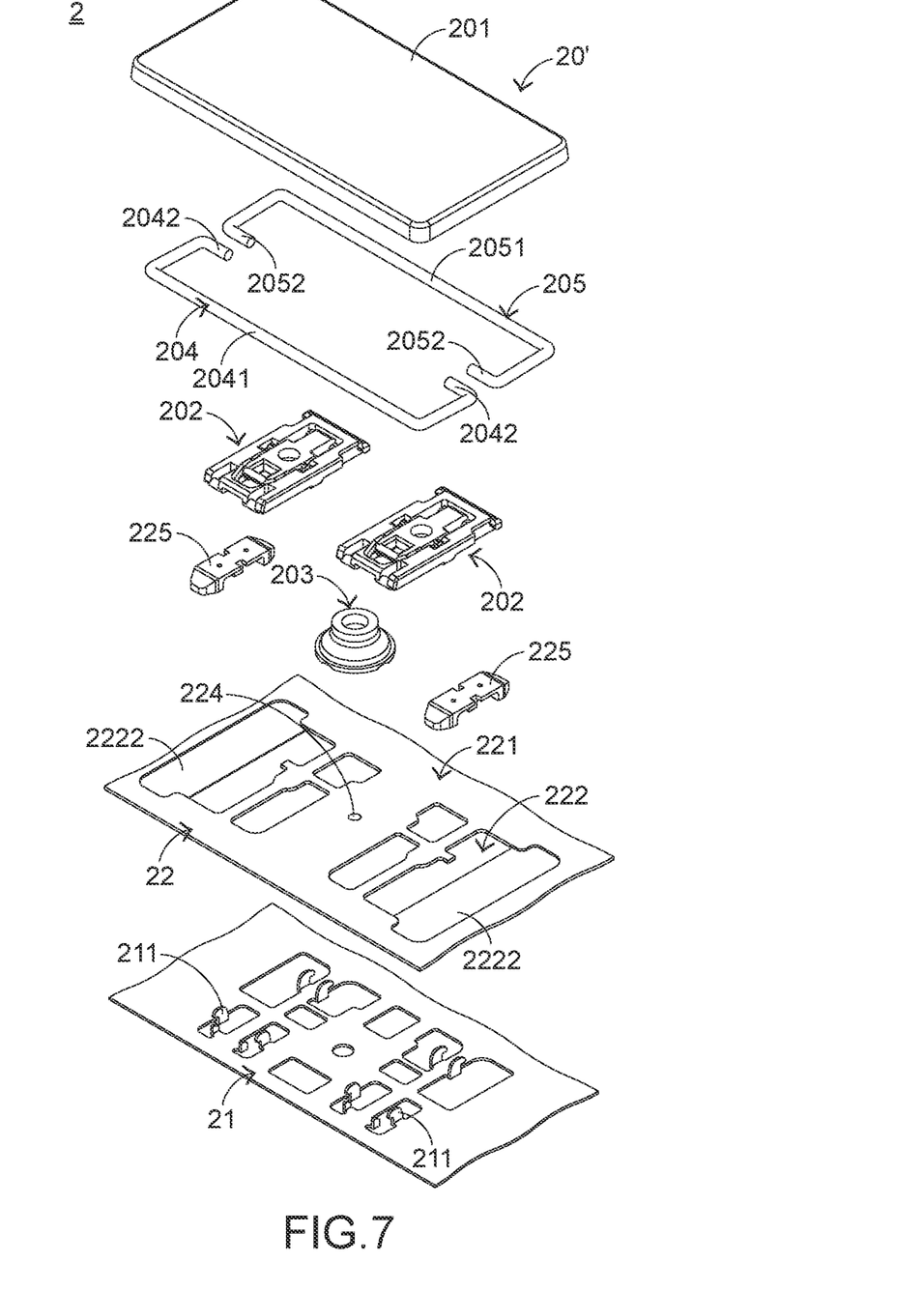
FIG. 7 is a schematic exploded view illustrating a portion of the keyboard device according to the first embodiment of the present invention and taken along a viewpoint.
Figure 8:
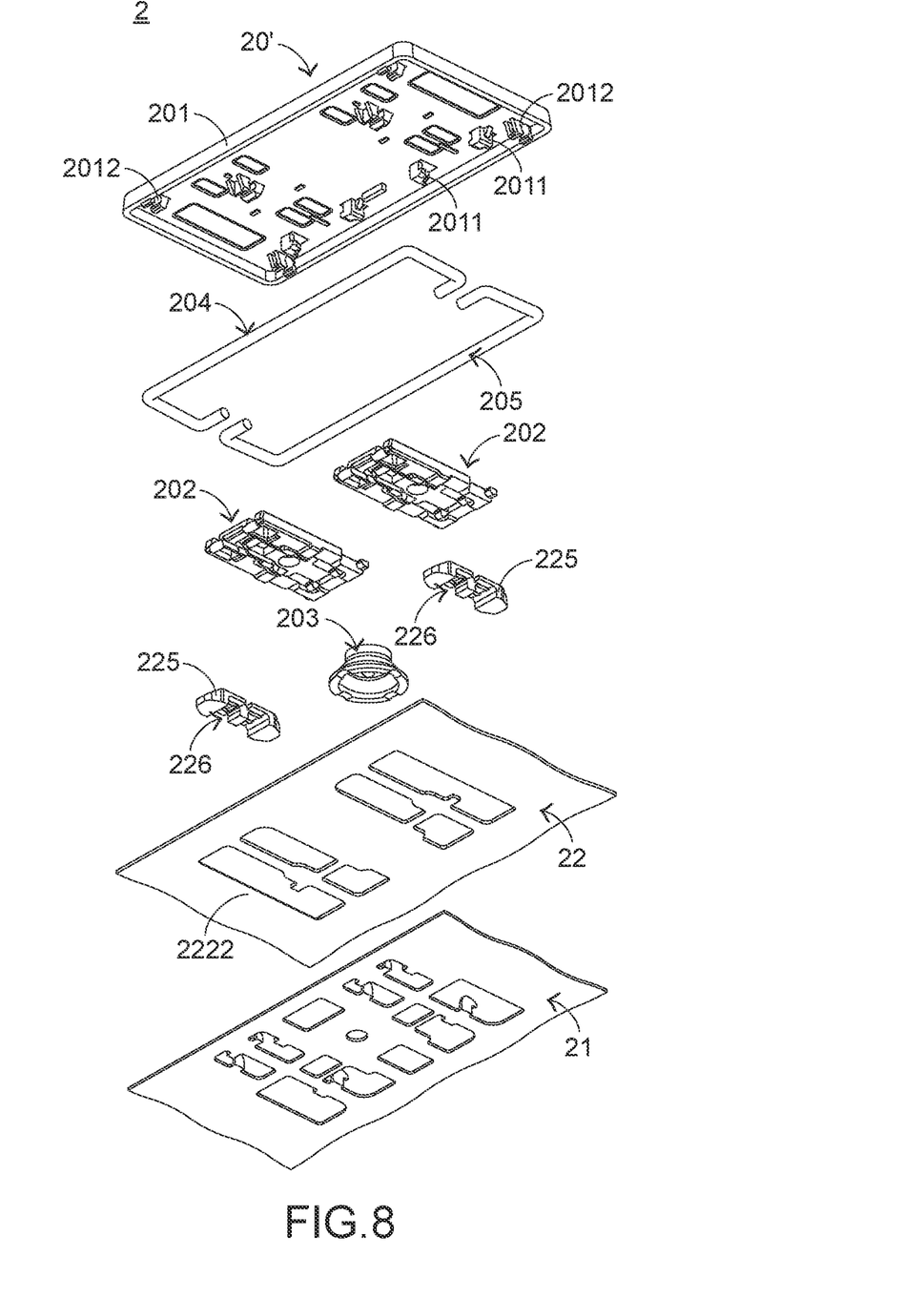
FIG. 8 is a schematic exploded view illustrating a portion of the keyboard device according to the first embodiment of the present invention and taken along another viewpoint.
Figure 9:
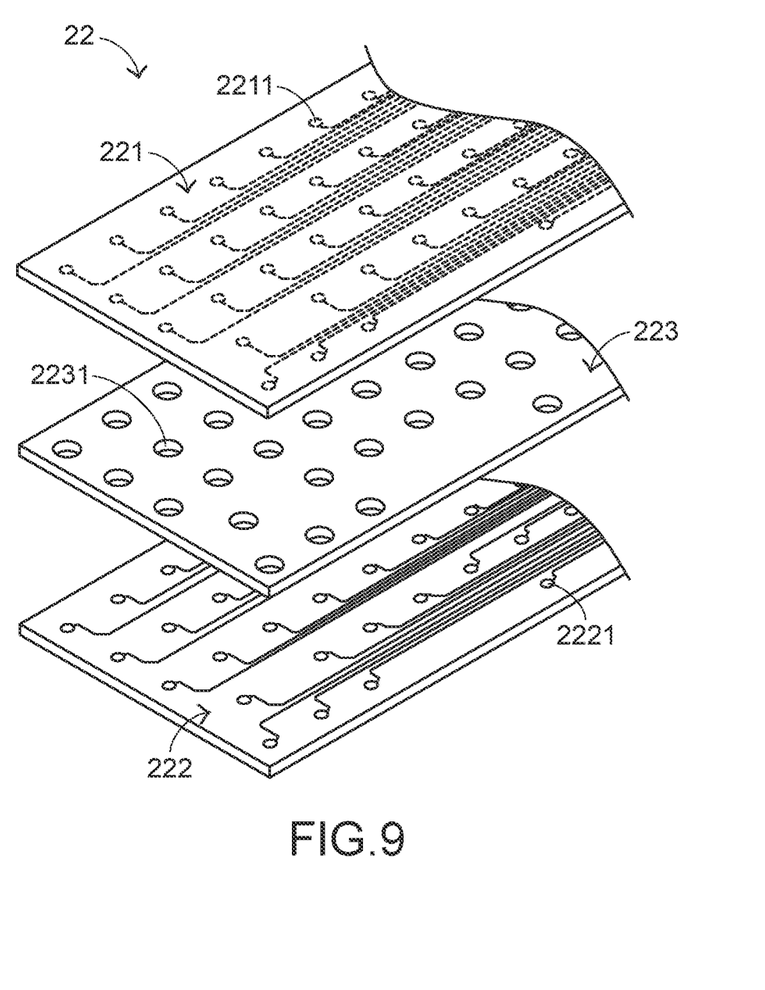
FIG. 9 is a schematic exploded view illustrating a portion of the switch circuit board of the keyboard device according to the first embodiment of the present invention and taken along another viewpoint.

Hereinafter, the inner structure of the keyboard device 2 will be illustrated with reference to FIGS. 7, 8 and 9. FIG. 7 is a schematic exploded view illustrating a portion of the keyboard device according to the first embodiment of the present invention and taken along a viewpoint. FIG. 8 is a schematic exploded view illustrating a portion of the keyboard device according to the first embodiment of the present invention and taken along another viewpoint. FIG. 9 is a schematic exploded view illustrating a portion of the switch circuit board of the keyboard device according to the first embodiment of the present invention and taken along another viewpoint. In addition to the plural key structures 20 and 20', the keyboard device 2 further a base plate 21 and a switch circuit board 22. The base plate 21 is disposed under the plural key structures 20 and 20' and connected with the plural key structures 20 and 20'. The switch circuit board 22 is arranged between the plural key structures 20, 20' and the base plate 21. When the switch circuit board 22 is triggered by one of the plural key structures 20 and 20', a corresponding key signal is generated. The switch circuit board 22 comprises an upper wiring plate 221, a lower wiring plate 222, a separation layer 223, a key switch 224 and plural soft covering elements 225. Each of the key structures 20' comprises a keycap 201, at least one scissors-type connecting element 202, an elastic element 203, a first stabilizer bar 204 and a second stabilizer bar 205. The scissors-type connecting element 202 is connected with the corresponding keycap 201 and the base plate 21. Through the scissors-type connecting element 202, the keycap 201 is fixed on the base plate 21 and moved relative to the base plate 21. The elastic element 203 is arranged between the corresponding keycap 201 and the switch circuit board 22, and aligned with the corresponding key switch 224. In an embodiment, the base plate 21 is made of a metallic material, the elastic element 203 is a rubbery elastomer, and the scissors-type connecting element 202 is made of a plastic material.

Please refer to FIGS. 7 and 8. Both of the first stabilizer bar 204 and the second stabilizer bar 205 are connected with the keycap 201. The first stabilizer bar 204 comprises a first linking bar part 2041 and two first hook parts 2042. The first linking bar part 2041 is connected with the keycap 201. The two first hook parts 2042 are located at two ends of the first stabilizer bar 204, respectively. Similarly, the second stabilizer bar 205 comprises a second linking bar part 2051 and two second hook parts 2052. The second linking bar part 2051 is connected with the keycap 201. The two second hook parts 2052 are located at two ends of the second stabilizer bar 205, respectively. The base plate 21 comprises plural base plate hooks 211. The plural base plate hooks 211 are connected with the scissors-type connecting element 202 in order to fix the scissors-type connecting element 202 on the base plate 21. Moreover, the keycap 201 comprises plural first coupling parts 2011 and plural second coupling parts 2012. The plural first coupling parts 2011 are disposed on an inner surface of the keycap 201 and connected with the scissors-type connecting element 202. The plural second coupling parts 2012 are also are disposed on the inner surface of the keycap 201. Moreover, the plural second coupling parts 2012 are connected with the first linking bar part 2041 and the second linking bar part 2051.

The upper wiring plate 221 of the switch circuit board 22 comprises an upper circuit pattern 2211. In addition, the upper circuit pattern 2211 is formed on a bottom surface of the upper wiring plate 221. The lower wiring plate 222 is disposed under the upper wiring plate 221. The lower wiring plate 222 comprises a lower circuit pattern 2221 and extensions regions 2222. In addition, the lower circuit pattern 2221 is formed on a top surface of the lower wiring plate 222. The separation layer 223 is arranged between the upper wiring plate 221 and the lower wiring plate 222. In addition, the separation layer 223 comprises plural perforations 2231 corresponding to the plural keycaps 201. The upper circuit pattern 2211 and the lower circuit pattern 2221 are separated from each other through the separation layer 223. Moreover, plural key switches 224 are defined by the upper circuit pattern 2211, the plural perforations 2231 and the lower circuit pattern 2221 collaboratively. Each key switch 224 is aligned with the corresponding key structure 20 or 20'. When the key switch 224 is triggered by the corresponding key structure 20 or 20', the corresponding key signal is generated.

Figure 10:
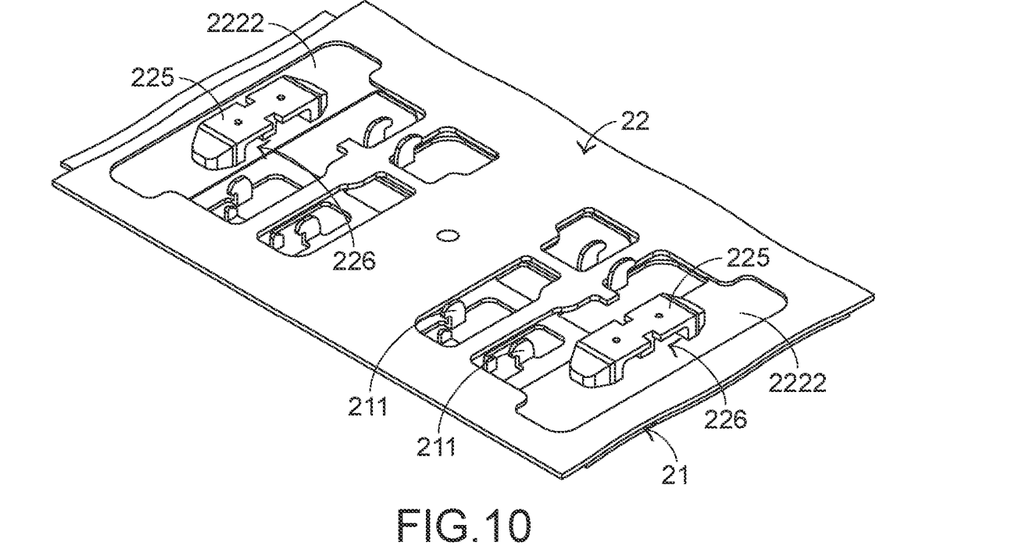
FIG. 10 is a schematic perspective view illustrating a portion of the combination of the base plate and the switch circuit board of the keyboard device according to the first embodiment of the present invention.

FIG. 10 is a schematic perspective view illustrating a portion of the combination of the base plate and the switch circuit board of the keyboard device according to the first embodiment of the present invention. Please refer to FIGS. 7 and 10. The extension regions 2222 are extended from the lower wiring plate 222 and protruded out of the upper wiring plate 221 and the separation layer 223. The soft covering elements 225 are disposed on the extension regions 2222 of the switch circuit board 22. Moreover, plural accommodation spaces 226 are defined by the soft covering elements 225 and the switch circuit board 22. The first hook parts 2042 and the second hook parts 2052 are inserted into the corresponding accommodation spaces 226. Consequently, the first hook parts 2042 and the second hook parts 2052 are permitted to be moved within the accommodation spaces 226. The soft covering elements 225 are adhered on the top surfaces of the corresponding extension regions 2222. In this embodiment, the accommodation spaces 226 are throughholes. That is, the first hook parts 2042 and the second hook parts 2052 are penetrated through the corresponding accommodation spaces 226. The soft covering elements 225 are made of polysiloxane or polymerized siloxane (i.e., silicone resin) or a soft plastic material.

The operations of depressing the key structure 20' will be described as follows. While the keycap 201 of any key structure 20' is depressed, the keycap 201 is moved downwardly relative to the base plate 21. Since the scissors-type connecting element 202 is pushed by the keycap 201, the scissors-type connecting element 202 is correspondingly swung. Moreover, as the keycap 201 is moved downwardly to push and compress the elastic element 203, the elastic element 203 is subjected to deformation to trigger the corresponding key switch 224. Consequently, the corresponding key signal is generated. When the key structure 20' is no longer depressed, the keycap 201 is moved upwardly relative to the base plate 21 in response to a restoring elastic force of the elastic element 203. As the keycap 201 is moved upwardly, the scissors-type connecting element 202 is correspondingly swung and switched from the stacked state to the open-scissors state again. Consequently, the keycap 201 is returned to its original position.

Figure 11:
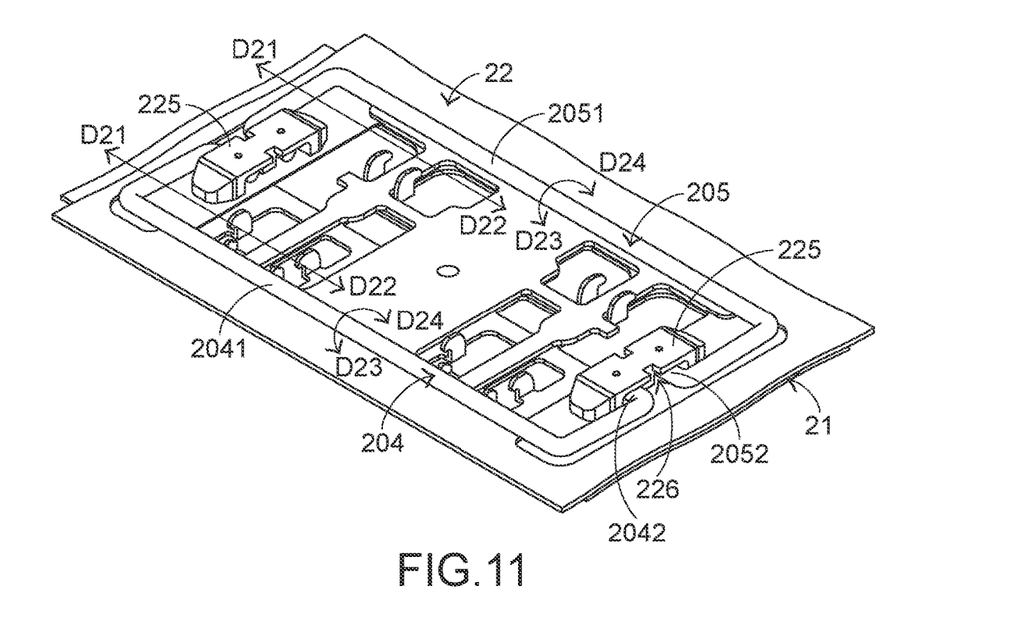
FIG. 11 schematically illustrates the actions of the first stabilizer bar and the second stabilizer bar of the keyboard device according to the first embodiment of the present invention.

FIG. 11 schematically illustrates the actions of the first stabilizer bar and the second stabilizer bar of the keyboard device according to the first embodiment of the present invention. While the keycap 201 of the key structure 20' is moved upwardly or downwardly relative to the base 21, the first stabilizer bar 204 is moved in a first direction D21 or a second direction D22 and rotated in a first rotating direction D23 or a second rotating direction D24. Moreover, the first linking bar part 2041 of the first stabilizer bar 204 is rotated relative to the corresponding second coupling parts 2012, and the two first hook parts 2042 are rotated within the corresponding accommodation spaces 226. During rotation, the first hook parts 2042 are not contacted with the base plate 21. Similarly, the second stabilizer bar 205 is moved in the first direction D21 or the second direction D22 and rotated in the first rotating direction D23 or the second rotating direction D24. Moreover, the second linking bar part 2051 of the second stabilizer bar 205 is rotated relative to the corresponding second coupling parts 2012, and the two second hook parts 2052 are rotated within the corresponding accommodation spaces 226. During rotation, the second hook parts 2052 are not contacted with the base plate 21.

From the above descriptions, the keyboard device 2 comprises the extension regions 2222 and the soft covering elements 225. The first hook parts 2042 and the second hook parts 2052 are separated from the base plate 21 through the extension regions 2222 and the soft covering elements 225. Even if all of the first stabilizer bar 204, the second stabilizer bar 205 and the base plate 21 are made of the metallic material, the drawbacks of the conventional technology will not be generated. Since the first hook parts 2042 and the second hook parts 2052 are not contacted with the base plate 21, the first hook parts 2042 and the second hook parts 2052 do not collide with the base plate 21 to generate the unpleasant noise. Consequently, the keyboard device 2 of the present invention is capable of reducing the noise.

Figure 12:
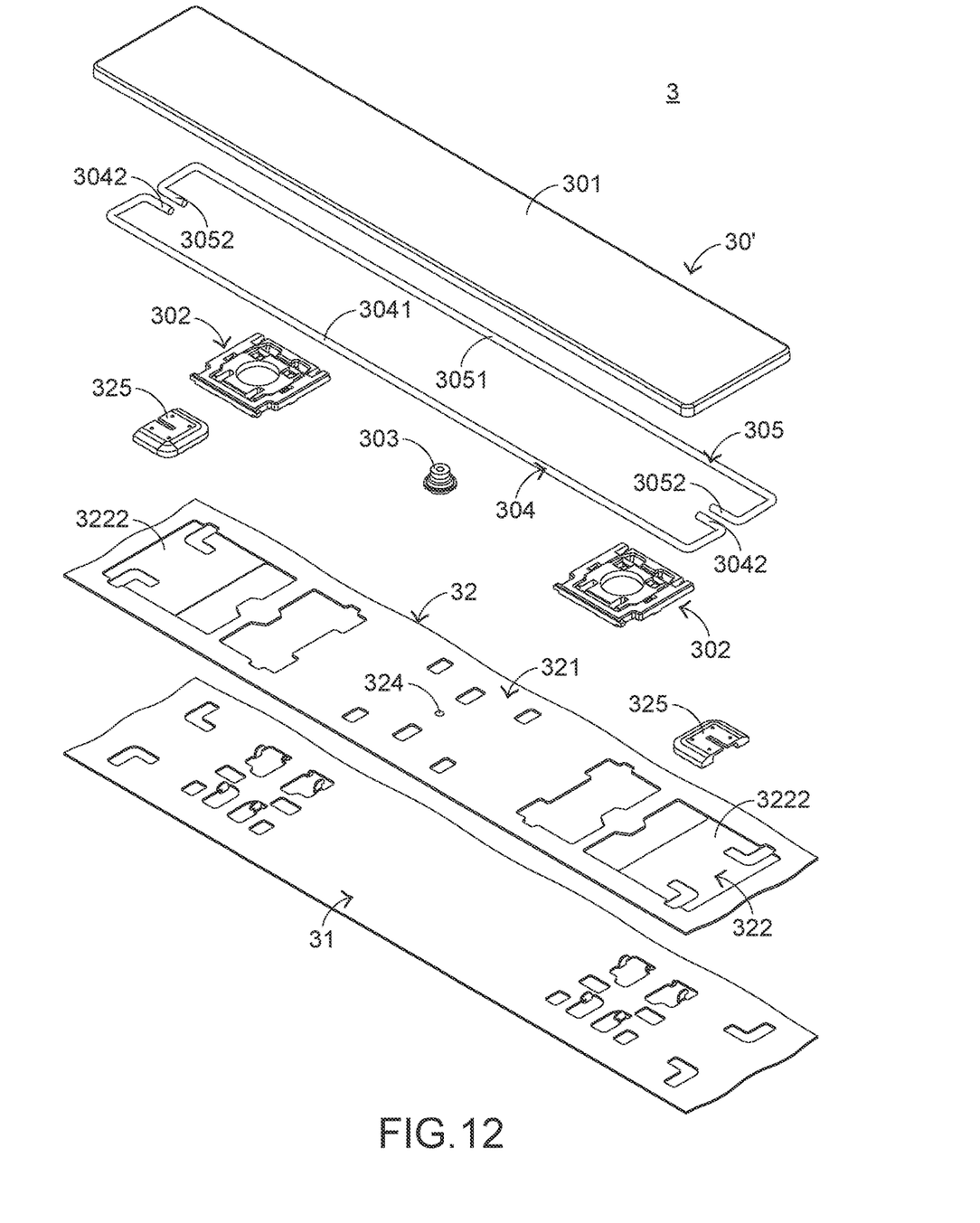
FIG. 12 is a schematic exploded view illustrating a portion of a keyboard device according to a second embodiment of the present invention and taken along a viewpoint.
Figure 13:
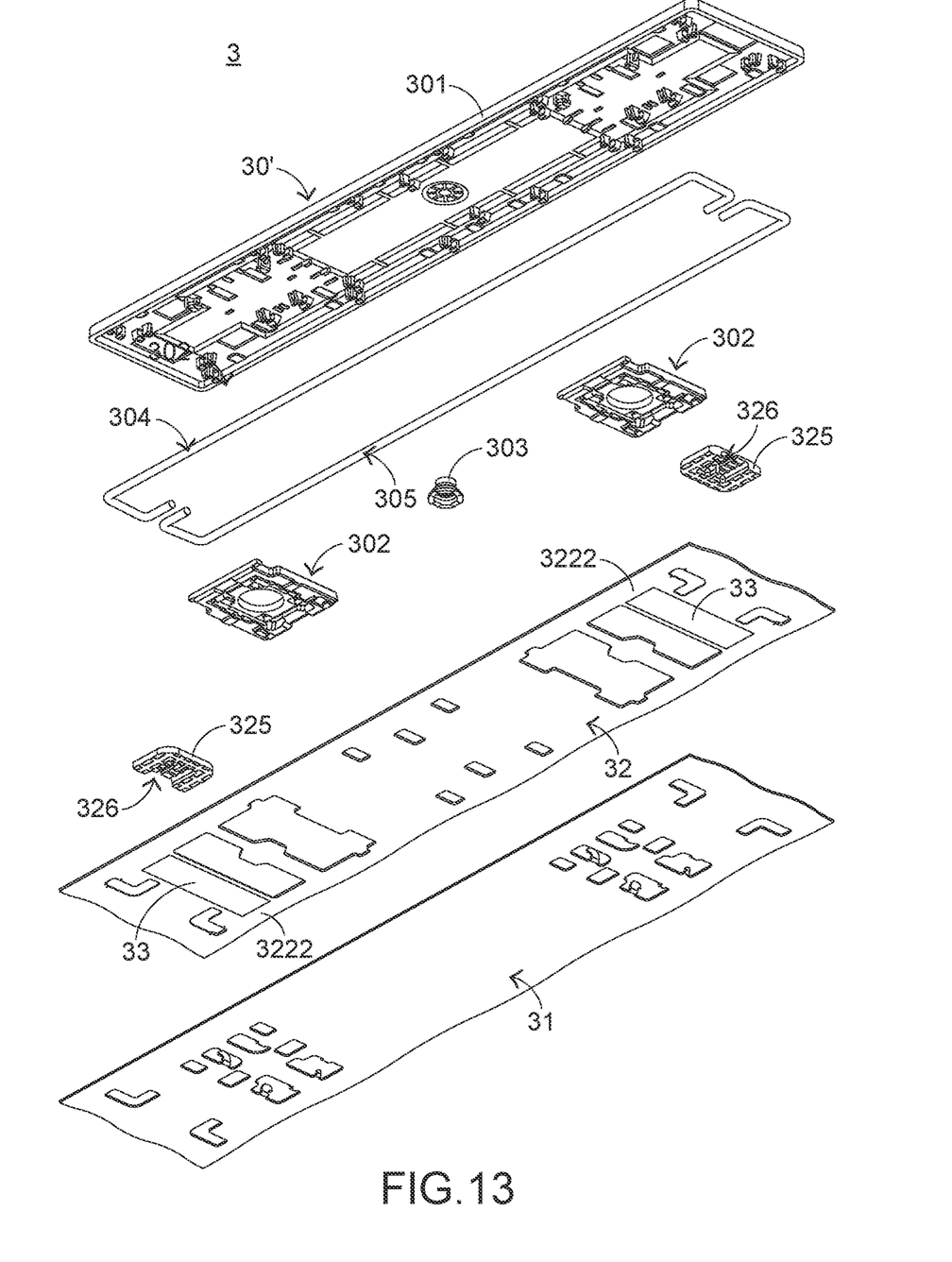
FIG. 13 is a schematic exploded view illustrating a portion of the keyboard device according to the second embodiment of the present invention and taken along another viewpoint.

The present invention further provides a keyboard device of a second embodiment, which is distinguished from the first embodiment. FIG. 12 is a schematic exploded view illustrating a portion of a keyboard device according to a second embodiment of the present invention and taken along a viewpoint. FIG. 13 is a schematic exploded view illustrating a portion of the keyboard device according to the second embodiment of the present invention and taken along another viewpoint. Please refer to FIGS. 12 and 13. In this embodiment, the keyboard device 3 comprises plural key structures 30', a base plate 31 and a switch circuit board 32. Each of the key structures 30' comprises a keycap 301, at least one scissors-type connecting element 302, an elastic element 303, a first stabilizer bar 304 and a second stabilizer bar 305. The first stabilizer bar 304 comprises a first linking bar part 3041 and two first hook parts 3042. The second stabilizer bar 305 comprises a second linking bar part 3051 and two second hook parts 3052. The switch circuit board 32 comprises an upper wiring plate 321, a lower wiring plate 322, a separation layer (not shown), a key switch 324 and plural soft covering elements 325. The lower wiring plate 322 comprises extensions regions 3222. Except for the following two items, the structures of the keyboard device 3 of this embodiment are substantially identical to those of the keyboard device 2 of the first embodiment, and are not redundantly described herein. Firstly, the structure of the soft covering element 325 is distinguished from the soft covering element of the first embodiment. Secondly, the keyboard device 3 of this embodiment further comprises adhesives 33.

Please refer to FIG. 12. The soft covering elements 325 are disposed on the extension regions 3222 of the switch circuit board 32. Moreover, plural accommodation spaces 326 are defined by the soft covering elements 325 and the switch circuit board 32. The first hook parts 3042 and the second hook parts 3052 are inserted into the corresponding accommodation spaces 326. The soft covering elements 325 are adhered on the top surfaces of the corresponding extension regions 3222. In this embodiment, an end of the accommodation space 326 is closed. The closed end of the accommodation spaces 326 is helpful to reduce the noise.

As shown in FIG. 13, the keyboard 3 further comprises the adhesives 33. The adhesives 33 are aligned with the corresponding soft covering elements 325 and disposed on the bottom surfaces of the corresponding extension regions 3222. Through the adhesives 33, the lower wiring plate 322 is fixed on the base plate 31. That is, the adhesives 33 can facilitate the connection between the lower wiring plate 322 and the base plate 31. During the rotation of the first stabilizer bar 304 and the second stabilizer bar 305, the first stabilizer bar 304 and the second stabilizer bar 305 provide upward forces. If the connection between the lower wiring plate 322 and the base plate 31 is not firm, the lower wiring plate 322 is possibly pulled up by the first stabilizer bar 304 and the second stabilizer bar 305. Since the adhesives 33 can facilitate the connection between the lower wiring plate 322 and the base plate 31, the smoothness of moving the keycap 301 upwardly or downwardly is not impaired and the tactile feel of depressing the keycap 301 is enhanced.

From the above descriptions, the present invention provides the keyboard device. The lower wiring plate of the switch circuit board has extension regions. The first hook parts and the second hook parts are separated from the base plate through the extension regions. Consequently, the first hook parts and the second hook parts do not collide with the base plate. Moreover, the soft covering elements made of soft material are disposed on the extension regions to replace the metallic connecting structures of the conventional keyboard. Even if the first stabilizer bar and the second stabilizer bar are made of the metallic material, the first hook parts and the second hook parts are only contacted with the soft covering elements but not contacted with the metallic base plate. That is, the first hook parts and the second hook parts do not collide with the base plate to generate the unpleasant noise. Consequently, the keyboard device of the present invention is capable of reducing the noise.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
    a key structure comprising a keycap and a stabilizer bar, wherein the keycap is exposed outside the keyboard device, the stabilizer bar is connected with the keycap, and comprises a linking bar part and a hook part, wherein the linking bar part is connected with the keycap, and the hook part is located at an end of the linking bar part;
    a base plate disposed under the key structure, and connected with the key structure; and
    a switch circuit board arranged between the key structure and the base plate, wherein when the switch circuit board is triggered, a key signal is generated, wherein the switch circuit board comprises:
        a key switch aligned with the key structure, wherein when the key switch is triggered by the key structure, the key switch generates the key signal;

a soft covering element disposed on the switch circuit board, wherein an accommodation space is defined by the soft covering element and the switch circuit board collaboratively, and the hook part is inserted into the accommodation space, so that the hook part is permitted to be moved within the accommodation space;

an upper wiring plate comprising an upper circuit pattern, wherein the upper circuit pattern is formed on a bottom surface of the upper wiring plate;

a lower wiring plate disposed under the upper wiring plate, and comprising a lower circuit pattern, wherein the lower circuit pattern is formed on a top surface of the lower wiring plate; and a separation layer arranged between the upper wiring plate and the lower wiring plate, and comprising a perforation, wherein the upper circuit pattern and the lower circuit pattern are separated from each other through the separation layer, and the key switch is defined by the upper circuit pattern, the perforation and the lower circuit pattern collaboratively, wherein the lower wiring plate has an extension region, and the extension region is protruded out of the upper wiring plate and the separation layer, wherein the soft covering element is adhered on a top surface of the extension region, an end of the accommodation space is closed, and the hook part is inserted into the accommodation space.

2. The keyboard device according to claim 1, wherein the keyboard device further comprises an adhesive, and the adhesive is aligned with the soft covering element and disposed on a bottom surface of the extension region, wherein the lower wiring plate is fixed on the base plate through the adhesive.

3. The keyboard device according to claim 1, wherein the soft covering element is made of silicone resin or a soft plastic material.

4. The keyboard device according to claim 1, wherein the key structure further comprises:

a scissors-type connecting element connected with the keycap and the base plate, wherein the keycap is fixed on the base plate through the scissors-type connecting element, so that the keycap is movable relative to the base plate; and an elastic element arranged between the keycap and the switch circuit board, and aligned with the key switch, wherein when the elastic element is pushed by the keycap, the key switch is triggered by the elastic element, wherein when the elastic element is not pushed by the keycap, the elastic element provides an elastic force to the keycap.

5. The keyboard device according to claim 4, wherein the keycap comprises:

a first coupling part disposed on an inner surface of the keycap and connected with the scissors-type connecting element; and a second coupling part disposed on the inner surface of the keycap, and connected with the linking bar part.

6. The keyboard device according to claim 4, wherein the base plate comprises a base plate hook, wherein the base plate hook is connected with the scissors-type connecting element, so that the scissors-type connecting element is fixed on the base plate.

7. The keyboard device according to claim 4, wherein while the keycap is depressed, the keycap is moved relative to the base plate to push the elastic element, and the elastic element is subjected to deformation to trigger the switch circuit board, so that the key switch generates the key signal, wherein when the keycap is not depressed, the elastic element is restored to provide the elastic force, and the keycap is returned to an original position in response to the elastic force.

8. A keyboard device, comprising:

a key structure comprising a keycap and a stabilizer bar, wherein the keycap is exposed outside the keyboard device, the stabilizer bar is connected with the keycap, and comprises a linking bar part and a hook part, wherein the linking bar part is connected with the keycap, and the hook part is located at an end of the linking bar part;

a base plate disposed under the key structure, and connected with the key structure; and a switch circuit board arranged between the key structure and the base plate, wherein when the switch circuit board is triggered, a key signal is generated, wherein the switch circuit board comprises:

a key switch aligned with the key structure, wherein when the key switch is triggered by the key structure, the key switch generates the key signal;

a soft covering element disposed on the switch circuit board, wherein an accommodation space is defined by the soft covering element and the switch circuit board collaboratively, and the hook part is inserted into the accommodation space, so that the hook part is permitted to be moved within the accommodation space;

an upper wiring plate comprising an upper circuit pattern, wherein the upper circuit pattern is formed on a bottom surface of the upper wiring plate;

a lower wiring plate disposed under the upper wiring plate, and comprising a lower circuit pattern, wherein the lower circuit pattern is formed on a top surface of the lower wiring plate; and a separation layer arranged between the upper wiring plate and the lower wiring plate, and comprising a perforation, wherein the upper circuit pattern and the lower circuit pattern are separated from each other through the separation layer, and the key switch is defined by the upper circuit pattern, the perforation and the lower circuit pattern collaboratively, wherein the lower wiring plate has an extension region, and the extension region is protruded out of the upper wiring plate and the separation layer, wherein the soft covering element is adhered on a top surface of the extension region, the accommodation space is a through-hole, and the hook part is penetrated through the through-hole.

9. The keyboard device according to claim 8, further comprising an adhesive, wherein the adhesive is aligned with the soft covering element and disposed on a bottom surface of the extension region, wherein the lower wiring plate is fixed on the base plate through the adhesive.

* * * * *